United States Patent
Singh et al.

(10) Patent No.: US 11,455,450 B1
(45) Date of Patent: Sep. 27, 2022

(54) SYSTEM AND METHOD FOR PERFORMING SIGN-OFF TIMING ANALYSIS OF ELECTRONIC CIRCUIT DESIGNS

(71) Applicant: Cadence Design Systems, Inc., San Jose, CA (US)

(72) Inventors: Sushobhit Singh, Noida (IN); Arvind Nembili Veeravalli, Bangalore (IN); Naresh Kumar, Noida (IN); Beenish, Agra (IN); Mahesh Diwakar Sadhankar, Noida (IN); Ankit Sethi, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/337,937

(22) Filed: Jun. 3, 2021

(51) Int. Cl.
| | |
|---|---|
| *G06F 30/30* | (2020.01) |
| *G06F 30/3315* | (2020.01) |
| *G06F 30/31* | (2020.01) |
| *G06F 119/06* | (2020.01) |
| *G06F 119/12* | (2020.01) |
| *G06F 111/02* | (2020.01) |

(52) U.S. Cl.
CPC .......... *G06F 30/3315* (2020.01); *G06F 30/31* (2020.01); *G06F 2111/02* (2020.01); *G06F 2119/06* (2020.01); *G06F 2119/12* (2020.01)

(58) Field of Classification Search
CPC .. G06F 30/3315; G06F 30/31; G06F 2111/02; G06F 2119/06; G06F 2119/12

USPC .......................................................... 716/102
See application file for complete search history.

(56) References Cited

U.S. PATENT DOCUMENTS

| | | | |
|---|---|---|---|
| 9,009,635 B1* | 4/2015 | O'Riordan | G06F 30/33 716/106 |
| 2010/0192115 A1* | 7/2010 | Yang | G06F 30/33 716/104 |
| 2011/0023004 A1* | 1/2011 | Rao | G06F 30/30 716/136 |
| 2012/0315961 A1* | 12/2012 | Chen | G06F 1/3296 455/574 |
| 2017/0179957 A1* | 6/2017 | Kapoor | G06F 1/26 |
| 2019/0095564 A1* | 3/2019 | Atsatt | G06F 30/34 |
| 2019/0097626 A1* | 3/2019 | Bezzam | H03K 3/012 |
| 2021/0247838 A1* | 8/2021 | Bang | G06F 1/329 |

* cited by examiner

*Primary Examiner* — Jack Chiang
*Assistant Examiner* — Brandon Bowers
(74) *Attorney, Agent, or Firm* — Mark H. Whittenberger, Esq.; Holland & Knight LLP

(57) ABSTRACT

Embodiments include herein are directed towards a method for dynamic voltage and frequency scaling (DVFS) based timing signoff associated with an electronic design environment. Embodiments may include receiving, using a processor, an electronic design and specifying, via a graphical user interface, a voltage sweep for each power net associated with the electronic design. Embodiments may further include specifying, via the graphical user interface, at least one voltage sweep to be excluded from analysis. Embodiments may also include automatically generating DVFS configurations based upon, at least in part, the voltage sweep for each power net and the at least one voltage sweep to be excluded from analysis.

13 Claims, 9 Drawing Sheets

300

302 — Design Load and Timing Update

304 — Generate Power Rail Voltage Sweep and Voltage Exclusion Specification

306 — Generate and Setup Bounded Voltage (Min/Max) Configuration

308 — VDC Network Identification and Scope Generation using Bounded View

310 — Setup VDC Scope

312 — Generate DVFS Configurations

314 — DVFS based SMSC/CMMMC VDC timing analysis

Only below combinations chosen for analysis

| Combination # | PD1 | PD2 | PD3 | PD4 |
|---|---|---|---|---|
| 1 | 0.7v | 0.9v | 1.1v | 0.7v |
| 4 | 0.7v | 1.0v | 1.2v | 0.7v |
| 6 | 0.8v | 0.9v | 1.2v | 0.7v |
| 7 | 0.8v | 1.0v | 1.1v | 0.7v |

Below combinations are dropped since it is covered by other chosen voltage combinations

| Combination # | PD1 | PD2 | PD3 | PD4 | PD1<->PD2 | PD1<->PD3 | PD2<->PD3 |
|---|---|---|---|---|---|---|---|
| 2 | 0.7v | 0.9v | 1.2v | 0.7v | Comb #1 | Comb #4 | Comb #6 |
| 3 | 0.7v | 1.0v | 1.1v | 0.7v | Comb #4 | Comb #1 | Comb #7 |
| 5 | 0.8v | 0.9v | 1.1v | 0.7v | Comb #6 | Comb #7 | Comb #1 |
| 8 | 0.8v | 1.0v | 1.2v | 0.7v | Comb #7 | Comb #6 | Comb #4 |

FIG. 9

SYSTEM AND METHOD FOR PERFORMING SIGN-OFF TIMING ANALYSIS OF ELECTRONIC CIRCUIT DESIGNS

FIELD OF THE INVENTION

The present disclosure relates to a method of electronic circuit design, and more particularly, to a method of performing efficient timing analysis of a multiple-voltage circuit design.

BACKGROUND

Signals do not move instantly through a circuit, but experience delays as they travel through the components and interconnections. If two signals, such as a data signal and a corresponding clock signal, arrive at the same circuit component too far out of sync with each other, they will interact in unexpected ways and the component will not operate as intended, causing a timing violation. Timing analysis is therefore commonly employed during a design phase of the circuit, as part of a sign-off process, to confirm that the signals will be properly synchronized under the various conditions that the circuit can be expected to experience.

One of the conditions that can affect the speed of a signal is the supply voltage for the components. If a range of supply voltages are applicable to certain components, these components should be tested to determine the timing under at least both the maximum and minimum of this range.

These tests are complicated by multiple-voltage circuit designs. When different components in the circuit require different voltage sources and/or supply voltage ranges, differing voltage domains, or power domains, are created, and it will be necessary to re-analyze the circuit for each combination of voltages. These combinations grow exponentially in number in relation to the number of domains, such that even a small number of voltage domains can dramatically increase the duration of the required testing.

Independently controllable power domains are common in current designs to optimize power consumption. DVFS (Dynamic Voltage and Frequency Scaling) is a design technique used to dynamically modulate the supply voltage of power domains based on the required performance. Using DVFS techniques may result in an increased number of timing signoff corners and associated signoff challenges.

SUMMARY

In one or more embodiments of the present disclosure, a computer-implemented method for dynamic voltage and frequency scaling (DVFS) based timing signoff associated with an electronic design environment is provided. The method may include receiving, using a processor, an electronic design and specifying, via a graphical user interface, a voltage sweep for each power net associated with the electronic design. The method may further include specifying, via the graphical user interface, at least one voltage sweep to be excluded from analysis. The method may also include automatically generating DVFS configurations based upon, at least in part, the voltage sweep for each power net and the at least one voltage sweep to be excluded from analysis.

One or more of the following features may be included. The method may include generating a bounded corner configuration based upon, at least in part, the voltage sweep and the at least one voltage sweep to be excluded. The method may also include identifying a voltage domain crossing (VDC) only network based upon, at least in part, the bounded corner configuration. Automatically generating DVFS configurations may include optimizing using one or more inter power domain network interactions and voltage transition coverage. The method may further include reporting the DVFS configurations for a selected voltage and power/ground net combination. In some embodiments, identifying a VDC only network may include displaying a proximity based slew and bounded arrival window. Identifying a VDC only network may also include a common path pessimism removal (CPPR) aware clock network identification of one or more VDC paths. Identifying a VDC only network may further include proximity based slew selection for pessimism reduction.

In one or more embodiments of the present disclosure a computer-readable storage medium having stored thereon instructions, which when executed by a processor result in one or more operations is provided. Operations may include receiving, using a processor, an electronic design and specifying, via a graphical user interface, a voltage sweep for each power net associated with the electronic design. Operations may further include specifying, via the graphical user interface, at least one voltage sweep to be excluded from analysis. Operations may also include automatically generating DVFS configurations based upon, at least in part, the voltage sweep for each power net and the at least one voltage sweep to be excluded from analysis.

One or more of the following features may be included. Operations may include generating a bounded corner configuration based upon, at least in part, the voltage sweep and the at least one voltage sweep to be excluded. Operations may also include identifying a voltage domain crossing (VDC) only network based upon, at least in part, the bounded corner configuration. Automatically generating DVFS configurations may include optimizing using one or more inter power domain network interactions and voltage transition coverage. Operations may further include reporting the DVFS configurations for a selected voltage and power/ground net combination. Identifying a VDC only network may include displaying a proximity based slew and bounded arrival window. Identifying a VDC only network may also include a common path pessimism removal (CPPR) aware clock network identification of one or more VDC paths. Identifying a VDC only network may further include proximity based slew selection for pessimism reduction.

In one or more embodiments of the present disclosure, a system for dynamic voltage and frequency scaling (DVFS) based timing signoff associated with an electronic design environment is provided. The system may include a computing device having at least one processor configured to receive an electronic design and a graphical user interface configured to allow a user to specify a voltage sweep for each power net associated with the electronic design and to specify at least one voltage sweep to be excluded from analysis. The at least one processor may be further configured to automatically generate one or more DVFS configurations based upon, at least in part, the voltage sweep for each power net and the at least one voltage sweep to be excluded from analysis.

One or more of the following features may be included. The at least one processor may be further configured to generate a bounded corner configuration based upon, at least in part, the voltage sweep and the at least one voltage sweep to be excluded.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 3 is another exemplary flowchart of a DVFS based timing signoff process according to an embodiment of the present disclosure;

FIG. 9 is a diagram showing optimized voltage combinations according to an embodiment of the present disclosure.

DETAILED DESCRIPTION

Figure 1:
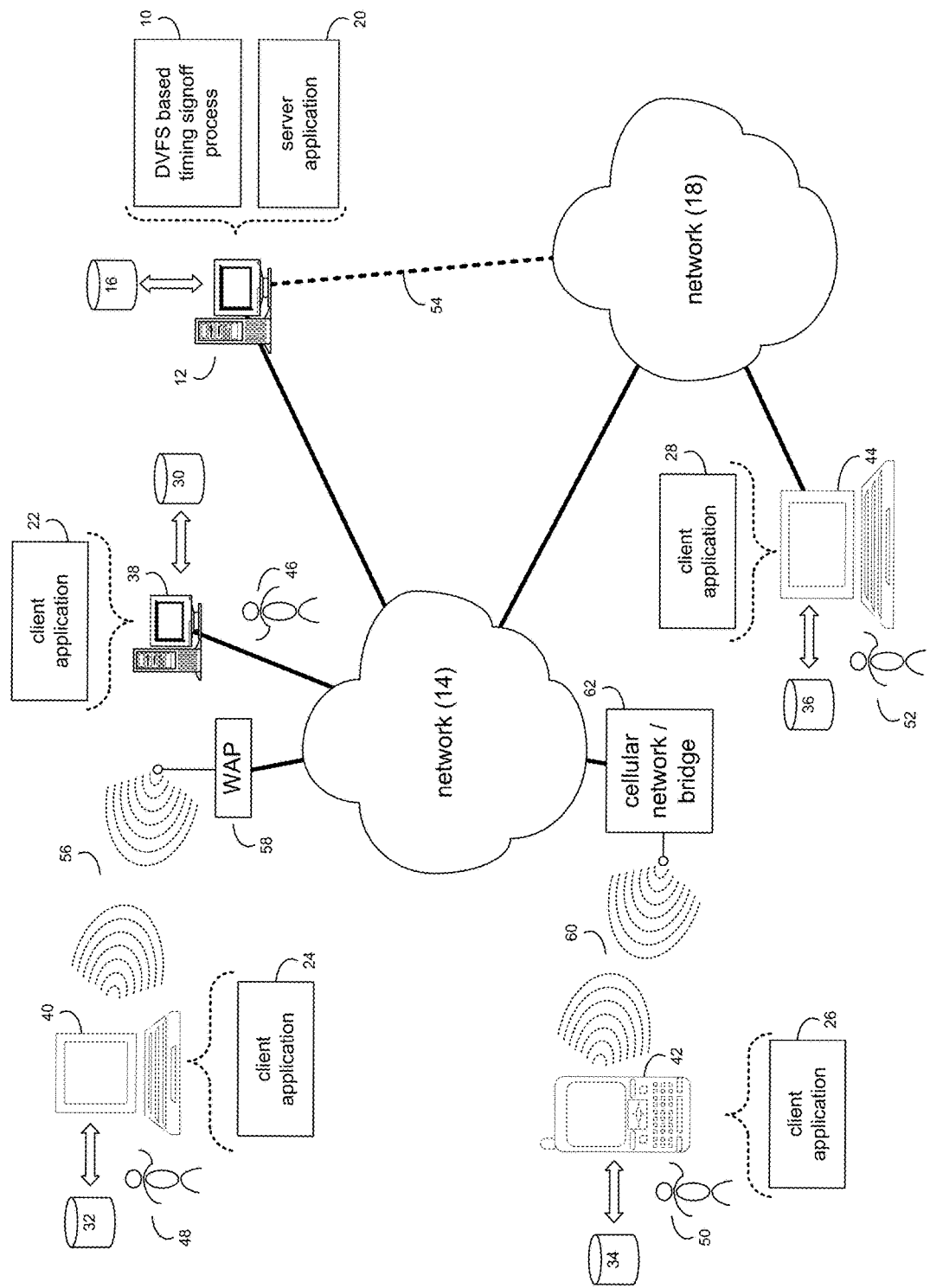
FIG. 1 diagrammatically depicts a dynamic voltage and frequency scaling (DVFS) based timing signoff process 10 coupled to a distributed computing network.

Embodiments included herein are directed towards a methodology for an electronic circuit designer to supply one or more voltage sweep definitions, for all or primary supply nets in an electronic design. From the declared voltage sweeps, embodiments included herein may automatically generate the multi-voltage configurations, where each configuration may represent a unique combination of the voltages for the power-ground nets. These voltage combinations may be represented as individual timing analysis views. Embodiments may combine the power of concurrent multi-mode, multi-corner (CMMMC) techniques to run these generated combinations all together or based on user selection. Embodiments included herein may also provide the flexibility to run these as single-mode, single-corner sessions if there is a need.

Performing a DVFS analysis on a complete electronic design is a daunting task and extreme redundancy exists in terms of applying voltage transitioning configurations on timing paths which are not seeing any voltage transitions. In order to confine the analysis to a relevant design portion, a netlist may be reduced to focus on an inter-power domain network only. This reduced netlist along with the voltage sweep defined MMMC session, provides a more relevant DVFS analysis setup. The netlist reduction takes place and a full analysis occurs only for the VDC network. For signal integrity the attacker nets for the VDC network and the arrival windows for the bounding voltage configurations may be maintained, for a bounded analysis. To achieve this the VDC scope may be created with views that provide the best and worst timing (delay representation) referred to herein as "bounded corner views". Additional information regarding these concepts are provided below and additional details regarding static timing analysis may be found in U.S. Pat. No. 10,114,920, which is available from the Assignee of the present disclosure and is herein incorporated by reference in its entirety.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Referring to FIG. 1, there is shown DVFS based timing signoff process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the routing process may reside on a client electronic device, such as a personal computer, notebook computer, personal digital assistant, or the like.

The instruction sets and subroutines of DVFS based timing signoff process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute DVFS based timing signoff process 10. Examples of client applications 22, 24, 26, 28 may include, but are not limited to, design verification tools such as those available from the assignee of the present disclosure. These applications may also be executed by server computer 12. In some embodiments, DVFS based timing signoff process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the DVFS based timing signoff process may be a client-side application (not shown) residing on one or more client electronic devices 38, 40, 42, 44 (e.g., stored on storage devices 30, 32, 34, 36, respectively). As such, the routing process may be a stand-alone application that interfaces with a client application (e.g., client applications 22, 24, 26, 28), or may be an applet/application that is executed within a client application. As such, the routing process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, DVFS based timing signoff process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
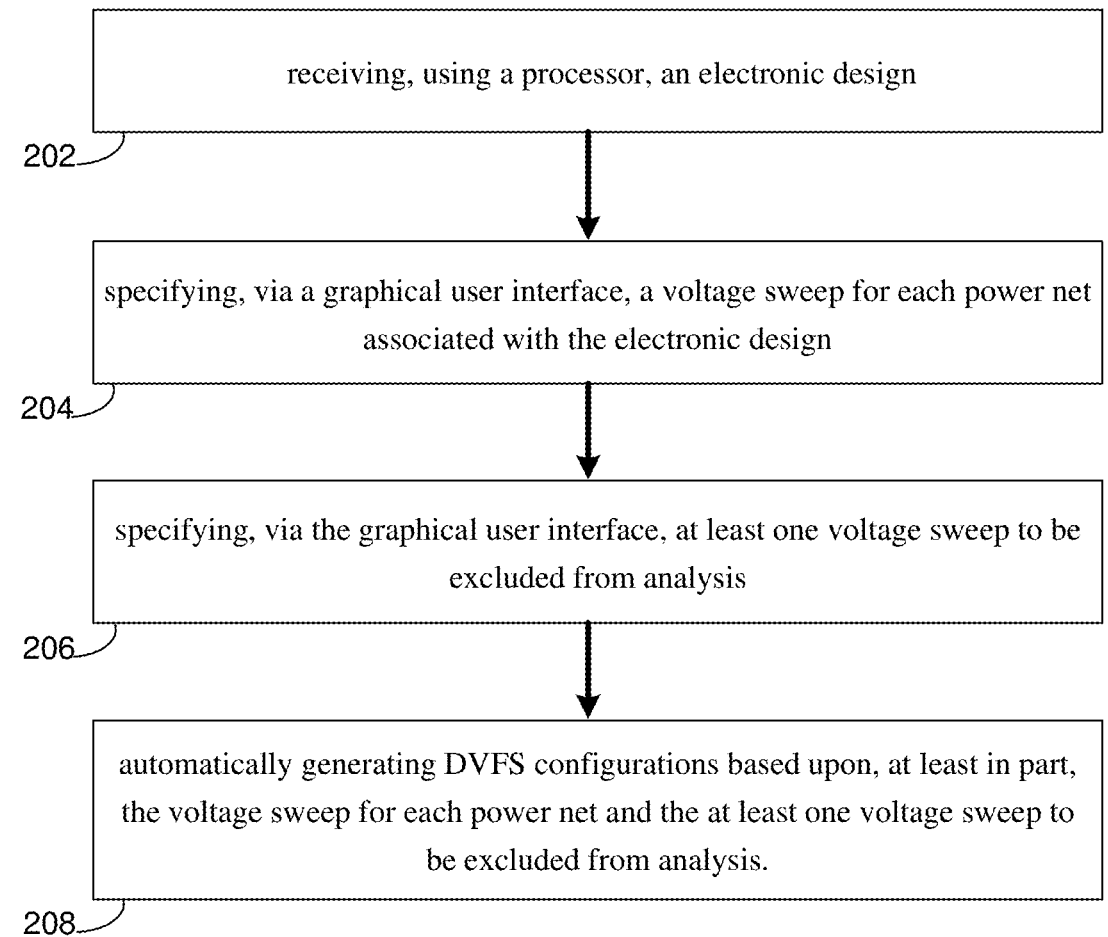
FIG. 2 is an exemplary flowchart of a DVFS based timing signoff process according to an embodiment of the present disclosure.
Figure 4:
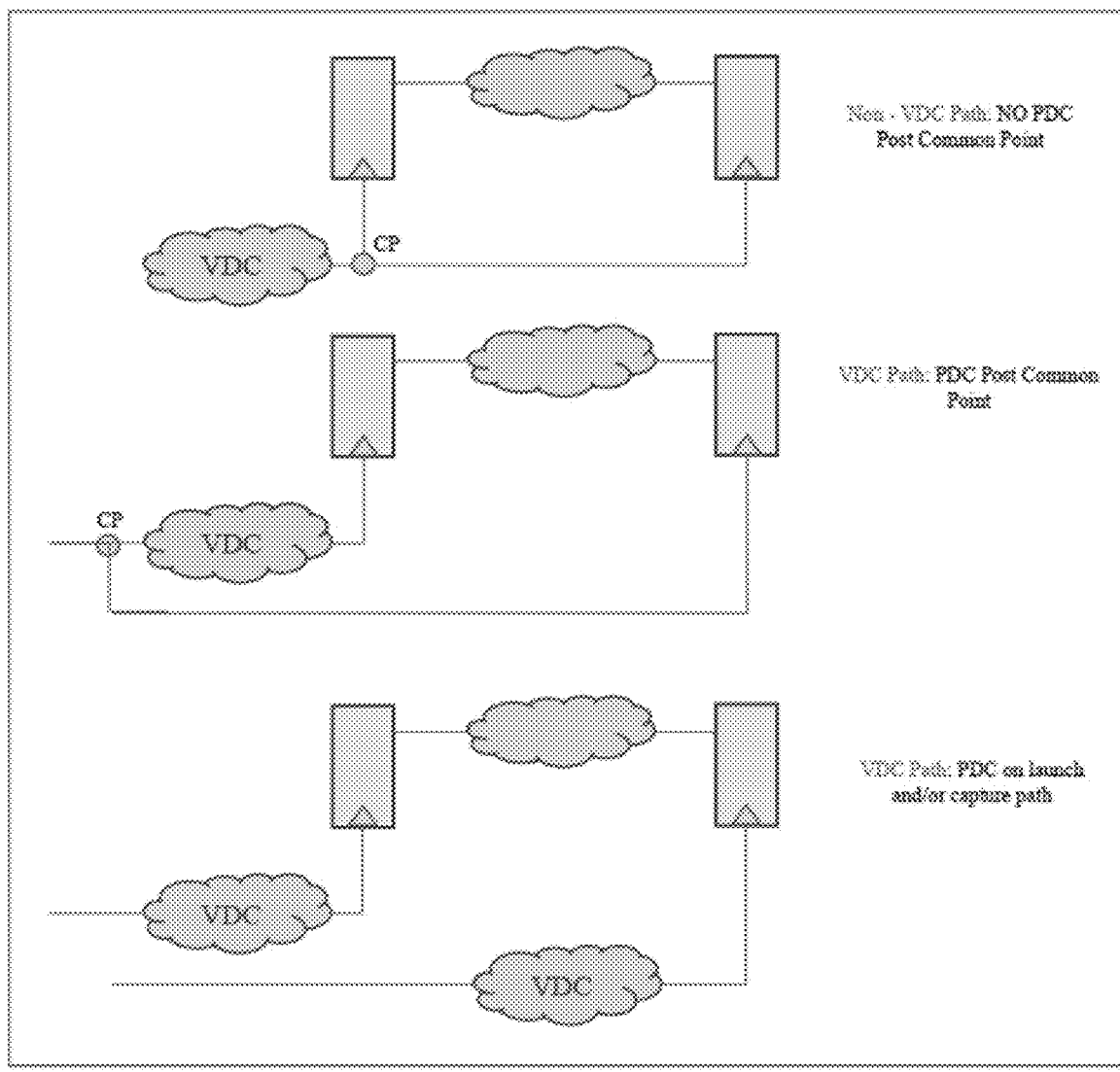
FIG. 4 is an exemplary diagram showing a common path pessimism removal (CPPR) aware clock path identification example according to an embodiment of the present disclosure.

Referring now to FIG. 2, a flowchart depicting an embodiment consistent with dynamic voltage and frequency scaling (DVFS) based timing signoff process 10 is provided. The process may include receiving 202, using a processor, an electronic design and specifying 204, via a graphical user interface, a voltage sweep for each power net associated with the electronic design. The process may further include specifying 206, via the graphical user interface, at least one voltage sweep to be excluded from analysis. The process may also include automatically generating 208 DVFS configurations based upon, at least in part, the voltage sweep for each power net and the at least one voltage sweep to be excluded from analysis. Numerous other operations are also within the scope of the present disclosure as provided in further detail hereinbelow.

Referring now to FIGS. 3-9, examples consistent with embodiments of DVFS based timing signoff process 10 are provided. When DVFS techniques are employed, power domains may operate at multiple supply voltages and the supply voltage may be different across the power domains based on a particular design specification. Synchronous paths between these power domains are referred to herein as Voltage Domain Crossing (VDC) paths. When a design has N power domains, each power domain operating at M voltages, then, MAN voltage combinations may be required for VDC timing signoff. For example, it is common to have 4 power domains, operating at 4 different voltages, resulting in 256 voltage combinations/corners (corresponding to each constraints mode, process, temperature, RC corner).

One approach involves analyzing the design for some of these critical voltage combinations, which may result in risk to the design, since analyzing all combinations may not be practical from a compute/cycle time point of view. Therefore, an analysis solution is needed that guarantees timing signoff of voltage domain crossing paths comprehending all the DVFS voltage combinations, with a significantly reduced cycle time/compute requirement.

Accordingly, embodiments of DVFS based timing signoff process 10 may provide a number of advantages over existing approaches. Some of these include, but are not limited to, providing the ability to specify an exhaustive set of voltages driving all the power rails in the design, enabling an analysis infrastructure for a user to analyze the exhaustive voltage combinations for all the power nets in the design, allowing a user to make some of the voltage combinations invalid, based on the user's knowledge of invalid voltage combinations, allowing an analysis of only inter-voltage island timing network (e.g., only those timing paths which cross the separate voltage islands which are separated in power domains), etc. DVFS based timing signoff process 10 may also optimize the number of combinations (in existing approaches these combinations are represented as a separate STA session represented by a timing analysis view) that may be created from the DVFS configurations to minimum the number of configurations required for signoff. DVFS based timing signoff process 10 may also report the generated specifications and/or provide the user with the exact voltage specifications that may be used for creating the views. DVFS based timing signoff process 10 may also automatically schedule the timing analysis for these generated combinations, which may include scheduling the runs in an optimized manner by utilizing the strengths of the CMMMC capability discussed herein. DVFS based timing signoff process 10 may also be configured to perform bounded inter voltage domain DVFS analysis.

Referring now to FIG. 3, a flowchart showing operations consistent with DVFS based timing signoff process 10 is provided. Embodiments included herein provide a comprehensive solution that is both optimized for cycle time/compute resource and guarantees timing signoff of VDC paths (see FIG. 4 for an example VDC path) covering all of the DVFS voltage combinations. In some embodiments, DVFS based timing signoff process 10 may receive 302 electronic design and timing information (e.g., design and timing files, etc.). The process may then allow a designer to generate 304 a DVFS specification, which may allow he/she to specify the operational rail voltages for all the power rails in the design which may be used to develop DVFS configurations as CMMMC views. Here, process 10 may also allow the designer to indicate the voltage combinations/configurations that need exclusion from the STA run, which helps in providing an optimal selection of views. Additional information regarding DVFS specification generation is discussed in further detail hereinbelow.

In some embodiments, DVFS based timing signoff process 10 may apply DVFS in a VDC analysis. Embodiments of process 10 may be configured to apply the DVFS solution to VDC analysis, thus harnessing the network reduction from the VDC only network identification and scoping the DVFS analysis on the VDC only network. Since VDC logic is a small percentage of the entire design (usually within 1%), process 10 may work off of pruned design data corresponding to VDC logic and associated aggressor data for signal integrity (SI) accuracy (referred to herein as "VDC scope"). Embodiments included herein may be configured to exploit the power domain interactions found in the design to identify a minimal subset of the voltage combinations that is enough for VDC signoff analysis.

In some embodiments, DVFS based timing signoff process 10 may include VDC network identification and scope generation, and VDC scope based CMMMC analysis. In some embodiments, VDC scope may be based on user specified power domains (rails) and the associated supply voltage values. DVFS based timing signoff process 10 may perform analysis at the bounding voltage corners (e.g., min and max voltage combinations). Accordingly, DVFS based timing signoff process 10 may identify the VDC logic, write a pruned design and associated aggressor data as VDC scope. The VDC scope generation process is described in further detail below.

In some embodiments, DVFS based timing signoff process 10 may perform VDC scope-based C-MMMC analysis. This may be based on user specified power domains (rails) and the associated supply voltage values. Process 10 may also be configured to identify the exhaustive and the optimal voltage combinations, discussed in further detail below. The VDC scope-based C-MMMC analysis may be based on the interacting power domains in the design and process 10 may identify the optimal/minimal subset of the voltage combinations that is enough for VDC signoff. VDC scope-based C-MMMC analysis may automatically create a required STA setup based on the identified optimal voltage combinations (e.g., one voltage combination may be represented as one view) and user specified voltage combination exclusions. This may be performed by creating or augmenting the view definitions. This analysis may review the optimal voltage combinations of only the VDC logic. Accordingly, embodiments included herein may enable 100+ voltage combinations that may be analyzed using the C-MMMC infrastructure, which may function effectively for over a million instances.

In some embodiments, DVFS based timing signoff process 10 may allow the designer to generate 304 a power rail voltage sweep and voltage exclusion specification. The voltage specification may include the voltage sweep for each power rail/domain and any user specified exclusions. In some embodiments, the voltage sweep specification for all plausible voltages for DVFS analysis may be performed using voltage sweep specification commands (such as those available from products available from the Assignee of the present disclosure) wherein the user may provide operating voltages for each power rail or power rail group. In this way, a power rail group may be defined as a set of power rails that may share the same operating voltage. Since there may be many power rails in the system, DVFS based timing signoff process 10 may provide flexibility to specify the voltage combinations that may be necessary to perform timing analysis. Multiple voltage sweep assertions may be allowed prior to final commitment of the configurations. Once a configuration is committed to the MMMC analysis views may be generated.

In some embodiments, DVFS based timing signoff process 10 may allow a designer to generate 304 a voltage sweep exclusion specification. Accordingly, applied voltage sweeps on the nets may be used to enumerate the DVFS analysis configurations, but from user experience and prior design knowledge, there may be voltage sweep configurations which are to be excluded. Accordingly, process 10 may provide the ability to specify the excluded voltage sweeps, which has an impact on optimal view configurations and overall solution runtime and memory footprints.

In some embodiments, DVFS based timing signoff process 10 may perform 312 automated DVFS configuration generation. With the voltage sweep and exclusion specification in place, process 10 may generate and load the MMMC analysis configurations, which culminates in a possible DVFS analysis setup. In some embodiments, process 10 may examine the exhaustive set of voltage sweeps on the nets, expand into analysis configurations and generate a view definition on disk. In this way, each analysis view may include a unique delay corner which includes the specific voltage assignment on power nets pertaining to a unique voltage configuration. The configuration creation may be followed by the loading of the configurations, e.g., view data reading for all the configurations.

In some embodiments, DVFS based timing signoff process 10 may generate 306 and setup one or more bounded corner configurations. In the generation of bounded VDC scope, the bounded corner configuration may be required, which indicates the configuration leading to a couple of views corresponding to bounding voltages as per sweep specifications. The process of choosing the bounding voltage configurations is discussed in further detail below. In this particular mode, the MMMC session including views corresponding to the bounding voltage specifications may be created and bounded VDC scope generation may be performed.

In some embodiments, DVFS based timing signoff process 10 may generate 312 and report the DVFS configurations. Full DVFS analysis may require the generation of an optimal view MMMC session. DVFS configuration generation and loading may be performed using two possible modes of constraint specification. In one approach, referred to herein as "base constraint read with optimal configuration generation", each view may share the base constraints and "view specific" incremental constraints may be loaded or asserted for each view during the DVFS signoff STA. In an alternative approach, referred to herein as "no constraint reading during configuration generation", view specific constraints may be loaded incrementally, during DVFS STA runs. This provides users with the flexibility to apply base and view specific constraints in the DVFS STA session. As the number of exhaustive configurations which may be created from the voltage sweeps defined may be high, in order to achieve a convergence of analysis of all configurations, redundant configurations should be avoided during VDC confirmation generation. Accordingly, DVFS based timing signoff process 10 may remove the redundant VDC configurations from the final configuration.

In order to cover these, consider a situation, as depicted in Table 1 below. In this example, there are four power domains/power nets in the design for VDC analysis consideration, keeping the user defined power domain transition exclusions in consideration. Each power domain has the following voltage sweeps associated with them:

TABLE 1

PG Net and Voltage Sweep

| Power Nets/Domains | Voltage Sweep |
|---|---|
| $PG_1$ | 0.6 V, 0.7 V |
| $PG_2$ | 0.8 V, 0.9 V |
| $PG_3$ | 1.0 V, 1.1 V |
| $PG_4$ | 0.7 V, 0.8 V |

In some embodiments, DVFS based timing signoff process 10 may generate exhaustive voltage combinations. For example, the exhaustive voltage combinations in the above example shown in Table 1 includes $4^2$ or 16 combinations, and hence 16 analysis views for complete DVFS analysis. Table 2 enumerates the exhaustive combinations. In this example, the user defined configuration exclusions have not been considered, which may be additional.

TABLE 2

Exhaustive Voltage Combinations

| #Comb | $PG_1$ | $PG_2$ | $PG_3$ | $PG_4$ |
|---|---|---|---|---|
| 1. | 0.6 | 0.8 | 1.0 | 0.7 |
| 2. | 0.6 | 0.8 | 1.0 | 0.8 |
| 3. | 0.6 | 0.8 | 1.1 | 0.7 |
| 4. | 0.6 | 0.8 | 1.1 | 0.8 |
| 5. | 0.6 | 0.9 | 1.0 | 0.7 |
| 6. | 0.6 | 0.9 | 1.0 | 0.8 |
| 7. | 0.6 | 0.9 | 1.1 | 0.7 |
| 8. | 0.6 | 0.9 | 1.1 | 0.8 |
| 9. | 0.7 | 0.8 | 1.0 | 0.7 |
| 10. | 0.7 | 0.8 | 1.0 | 0.8 |
| 11. | 0.7 | 0.8 | 1.1 | 0.7 |
| 12. | 0.7 | 0.8 | 1.1 | 0.8 |
| 13. | 0.7 | 0.9 | 1.0 | 0.7 |
| 14. | 0.7 | 0.9 | 1.0 | 0.8 |
| 15. | 0.7 | 0.9 | 1.1 | 0.7 |
| 16. | 0.7 | 0.9 | 1.1 | 0.8 |

In some embodiments, DVFS based timing signoff process 10 may be configured to generate optimal voltage configurations. To generate the optimal configurations, redundant configurations are to be identified. Accordingly, a multi-step process may be employed as is discussed in further detail hereinbelow. There are various exclusions on power domain crossings which may be considered for reduction of voltage configurations. Interacting power domains are the domains which have active power domain crossings within the VDC network. As discussed, a design may have multiple power domains and there are timing paths which cross from one power domain into the other, which are classified as VDC paths. There may also be the possibility that some of the VDC crossings never interact with each other. In one aspect of DVFS based timing signoff process 10 the process may identify these non-interacting power domains. In some cases the voltage transitions among these power domains may be don't care terms with respect to signoff. Considering the interacting power domains are PG1, PG2 and PG3 and there is no interaction with power domain PG4, embodiments included herein may filter the transitions for PG4 and may use all the configurations which have the maximum voltage for PG4. This reduces the requisite configurations to 8, as shown below in Table 3.

TABLE 3

Voltage Configurations considering VDC interactions

| #Comb | $PG_1$ | $PG_2$ | $PG_3$ | $PG_4$ |
|---|---|---|---|---|
| 1. | 0.6 | 0.8 | 1.0 | 0.8 |
| 2. | 0.6 | 0.8 | 1.1 | 0.8 |
| 3. | 0.6 | 0.9 | 1.0 | 0.8 |
| 4. | 0.6 | 0.9 | 1.1 | 0.8 |
| 5. | 0.7 | 0.8 | 1.0 | 0.8 |
| 6. | 0.7 | 0.8 | 1.1 | 0.8 |
| 7. | 0.7 | 0.9 | 1.0 | 0.8 |
| 8. | 0.7 | 0.9 | 1.1 | 0.8 |

In some embodiments, and primarily for VDC signoff, the voltage transition for all power domains should be covered in at least one analysis view. The view optimization process included herein may allow for all possible voltage transitions to be covered in at most one view, even if one view has the given voltage transition covered. Other views need not cover it, and embodiments included herein can completely remove those views which are a super set of already covered voltage transitions on other views. Examples of exhaustive combinations and the minimal/optimal combination of runs that are required may be found in FIGS. 8-9, discussed in further detail below.

Table 4 shows an example of the voltage transition and combinations covering them.

TABLE 4

Voltage Transitions and Combinations Covered

| Power Domain Pair | Voltage Transitions | Combinations |
|---|---|---|
| $PG_1, PG_2$ | 0.6→0.8 | $Comb_1, Comb_2$ |
|  | 0.6→0.9 | $Comb_3, Comb_4$ |
|  | 0.7→0.8 | $Comb_5, Comb_6$ |
|  | 0.7→0.9 | $Comb_7, Comb_8$ |
| $PG_2, PG_3$ | 0.8→1.0 | $Comb_1, Comb_5$ |
|  | 0.8→1.1 | $Comb_2, Comb_6$ |
|  | 0.9→1.0 | $Comb_3, Comb_7$ |
|  | 0.9→1.1 | $Comb_4, Comb_8$ |
| $PG_1, PG_3$ | 0.6→1.0 | $Comb_1, Comb_3$ |
|  | 0.6→1.1 | $Comb_2, Comb_4$ |
|  | 0.7→1.0 | $Comb_5, Comb_7$ |
|  | 0.7→1.1 | $Comb_6, Comb_8$ |

In some embodiments, and in order to optimize the number of views, embodiments included herein may analyze the optimal set of combinations to be considered and may keep that as the set of optimal configurations. In this example, the following combinations as shown in Table 5 are kept for complete signoff analysis coverage for VDC. The final set of combinations cover all other combinations through pairing process and all other combinations from Table 2.

TABLE 5

Optimal Voltage Configurations

| #Comb | $PG_1$ | $PG_2$ | $PG_3$ | $PG_4$ |
|---|---|---|---|---|
| 1. | 0.6 | 0.8 | 1.0 | 0.8 |
| 4. | 0.6 | 0.9 | 1.1 | 0.8 |
| 5. | 0.7 | 0.8 | 1.0 | 0.8 |
| 8. | 0.7 | 0.9 | 1.1 | 0.8 |

In some embodiments, DVFS based timing signoff process 10 may be configured to allow a user to review configurations without committing. It might often be needed to figure out which configurations are required and what the voltage sweeps, and exclusions are leading to as configurations. Accordingly, embodiments included herein provide a mechanism to not commit the configurations, in which case the user may probe the view definitions and may decide to incrementally make changes unless the final committed view definitions are not closed upon.

In some embodiments, DVFS based timing signoff process 10 may be configured to allow for the reporting of generated configurations. Additionally and/or alternatively, embodiments included herein provide a methodology for probing the configurations generated from the voltage sweep and exclusion specifications. This may be achieved using a reporting mechanism that may report the mapping of the voltage configurations and analysis views pertaining to that configuration. This command is particularly useful during uncommitted configurations.

In some embodiments, DVFS based timing signoff process 10 may be configured to query the analysis views from the power net voltages. VDC configuration creation may correspond with the MMMC analysis view generation, and embodiments included herein may query the analysis views/constraint modes/delay corners from the power net voltages.

In some embodiments, DVFS based timing signoff process 10 may include VDC network identification and scope creation capabilities. Inter-power domain (VDC) scope generation may be achieved by identifying the VDC network. In operation, process 10 may identify the components which are part of the VDC network and write out a scope of the objects which may be used for analyzing the VDC network only. The data only network identification may be performed by analyzing the fan-in and fan-out cones of the inter power domain arcs and associated clock network. In order to identify the VDC network due to inter-power domain arcs on the clock network, a common point aware scheme may be used. In order to maintain the pessimism during DVFS analysis under limits, bounded arrival windows may be used on the attackers, and a scheme of voltage-based slew selection for attackers may be used.

In some embodiments, and referring again to FIG. 4, an example showing a CPPR aware clock path identification is provided. Inter-power domain crossings on the clock network may lead to huge network inclusion, particularly if the complete network is included that is either triggered or captured by the clock propagating through the power domain crossings. To optimize this, embodiments included herein may make use of an observation that for any path, if there is no power domain crossing after the common point, any impact on delay due to level shifters upstream of the common point in the path may be mitigated by CPPR credit to the path. Using this approach, the VDC path definition is as explained in further detail below with regards to VDC scope creation.

Embodiments included herein include a process to identify the exact start-end pairs which leads to the VDC network. Process 10 may use cone marking to keep the combinational network within the pair of start-end pair. This reduces the size of scope by a huge margin. As used herein, a start-end pair may refer to two nodes in a given timing graph where from the start node of the graph to the end node of the graph, there are several possible paths. For example, when considering an endpoint, there may be many start points it can lead to if a fanin search is performed of that endpoint and this may result in far more logic to traverse. When focusing on a start-end pair, the process may reduce the effort required by reducing the logic that is between these two nodes. Accordingly, during the analysis, the process may determine only those start points to an endpoint that will have some voltage crossing edge in between these two nodes. If there is no voltage crossing between a start and endpoint, the process may discard the entire logic and that allows the process to perform a focused and efficient analysis.

In some embodiments, the path identification process may include numerous operations, some of which are discussed below. For example, if the VDC occurs before a CPPR point for the pair of start/end points, then the pair is not analyzed in the VDC-DVFS analysis. Moreover, if the VDC occurs on either launch or capture path exclusively, the path may be considered a VDC path and may be analyzed in the VDC-DVFS path. If the VDC occurs after the common point on either launch or capture path, it may be analyzed in the VDC-DVFS analysis.

As the size of the netlist is reduced and the VDC only network is retained in the scope, for SI analysis the attacker nets of the victim VDC network may also be retained in the scope. Without driving the network of the attacker nets, the real timing windows for SI analysis may not be derived. In order to deal with this issue, infinite timing windows and default slews on the aggressor during VDC analysis in each view are discussed in U.S. Pat. No. 10,114,920. The problem in using the infinite timing windows and minimum slews always is that this leads to a highly pessimistic VDC analysis.

Accordingly, embodiments included herein provide an approach to use bounded corner timing windows for aggressors and a VDC proximity-based aggressor slew selection approach to deal with the problem of excessive pessimism. These proposals are discussed in further detail hereinbelow.

Figure 5:
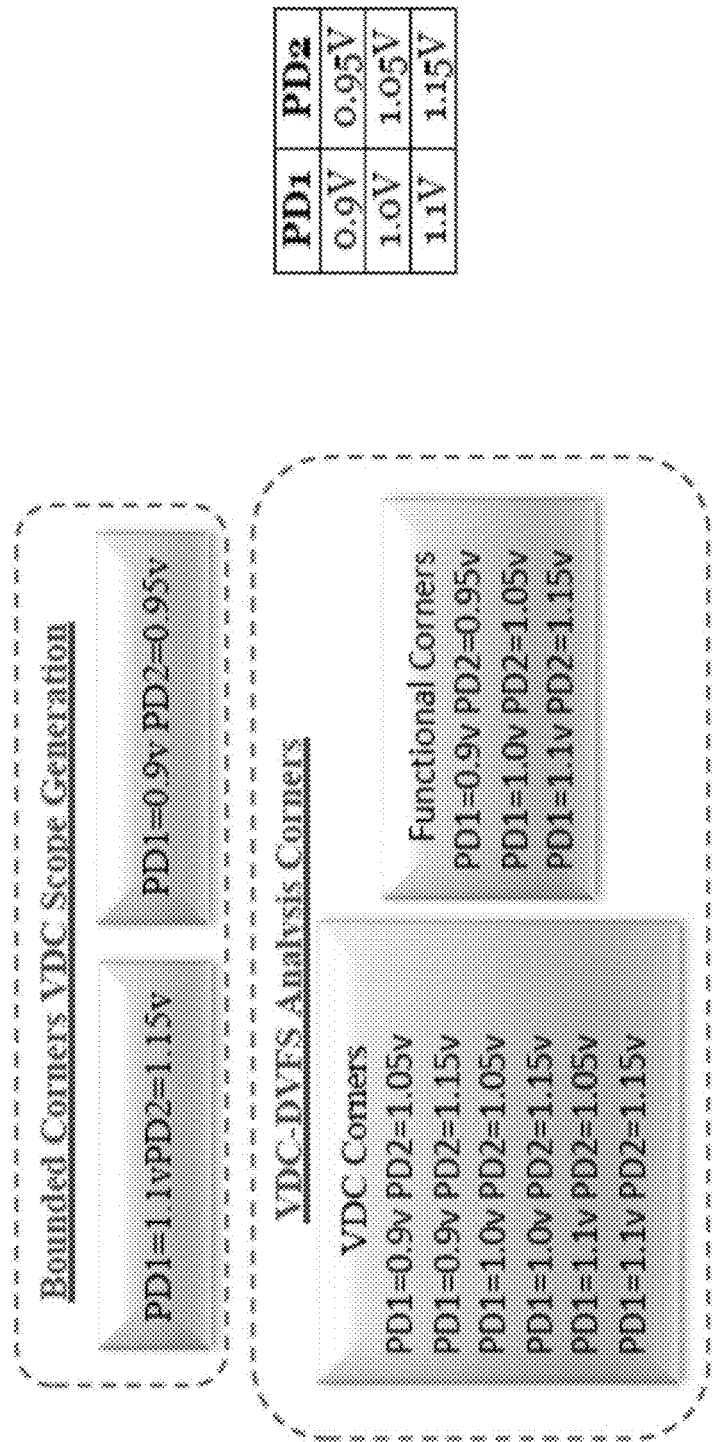
FIG. 5 is a diagram showing a bounded timing windows example according to an embodiment of the present disclosure.

Referring now to FIG. 5, an embodiment showing bounded corners VDC scope generation and VDC-DVFS analysis corners is provided. For a design having two power domains operating on three distinct voltage levels each, as shown in FIG. 5, there are 9 distinct analysis runs. The bounded corner views may be generated using the minimum and maximum voltage combinations, which leads to a C-MMMC session with two views corresponding to the bounded voltage configurations.

Figure 6:
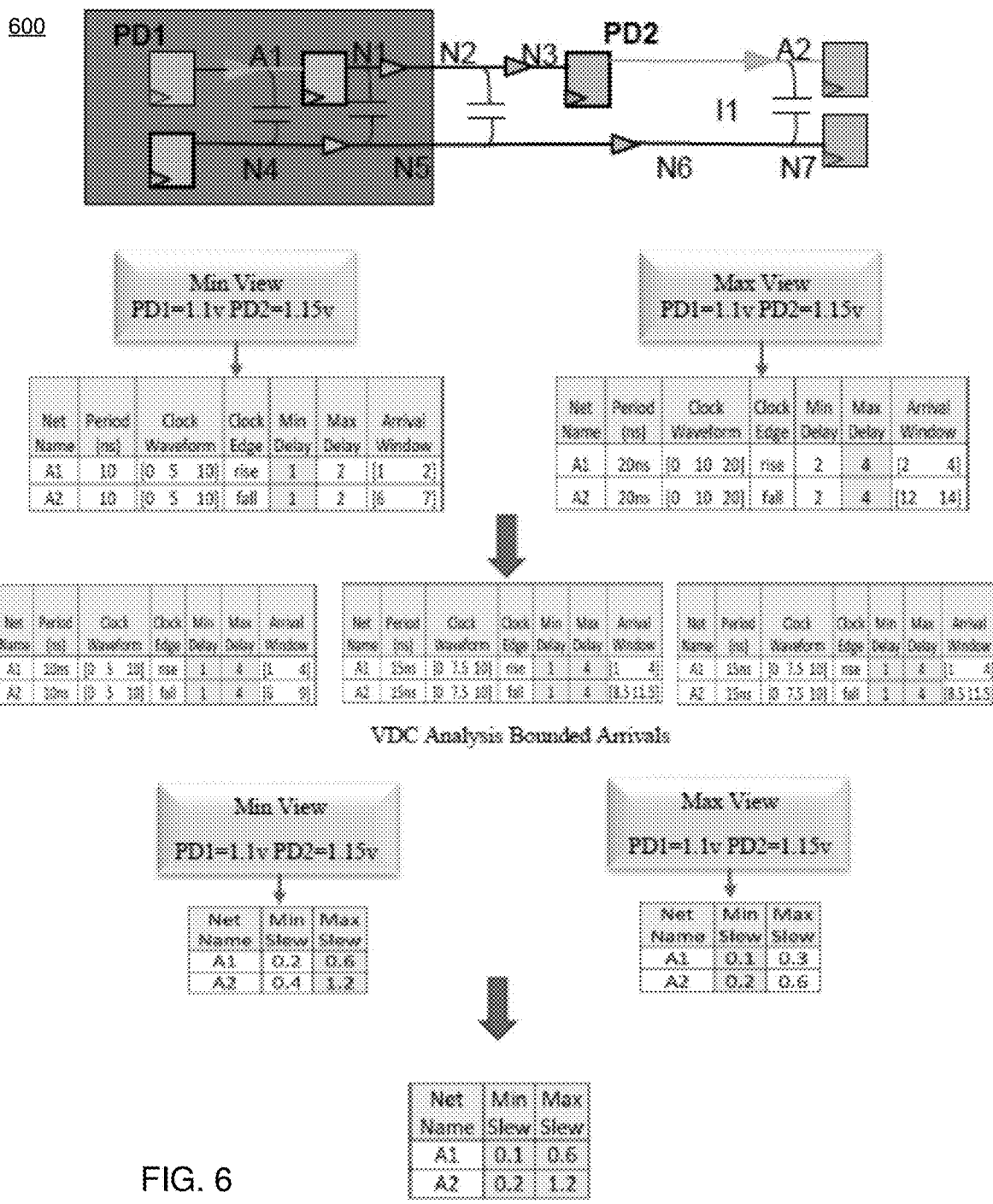
FIG. 6 is a diagram showing a bounded corner attacker timing window and slews example according to an embodiment of the present disclosure.

Referring now to FIG. 6, an embodiment showing an example of bounded corner attacker timing windows and slews is provided. This particular example shows a specific case of attacker nets A1 and A2 of the VDC network operating on the voltages in the example above. In this example, the bounded arrival windows may be derived from the minimum and maximum delays from the bounded corners, and the final windows may be merged to get the bounded windows. These bounded windows may be used in the VDC analysis views. This approach mitigates the pessimism impact due to infinite arrival windows.

In this particular approach the slews may also be bounded by the bounded corners. The slews on the attacker nets A1 and A2 in the example discussed and as depicted in FIG. 6, are kept bounded, by the minimum and maximum slews on the attacker nets.

In some embodiments, pessimism associated with choosing the infinite windows on the attacker nets may be mitigated by bounded corner timing windows and slew selection for attackers. To further reduce the pessimism, embodiments included herein exploit the fact that the attackers in the proximity of the VDC crossings may have the maximum impact of the delay variations due to voltage level shifting, while those attackers which are at a distance from VDC crossings may have relatively stabilized slews. Using this observation, DVFS based timing signoff process 10 may select the exact slews if the aggressor voltage matches that of the maximum corner if the net is not in proximity (e.g., has the slew stabilized), otherwise the chosen slew is the minimum slew.

Figure 7:
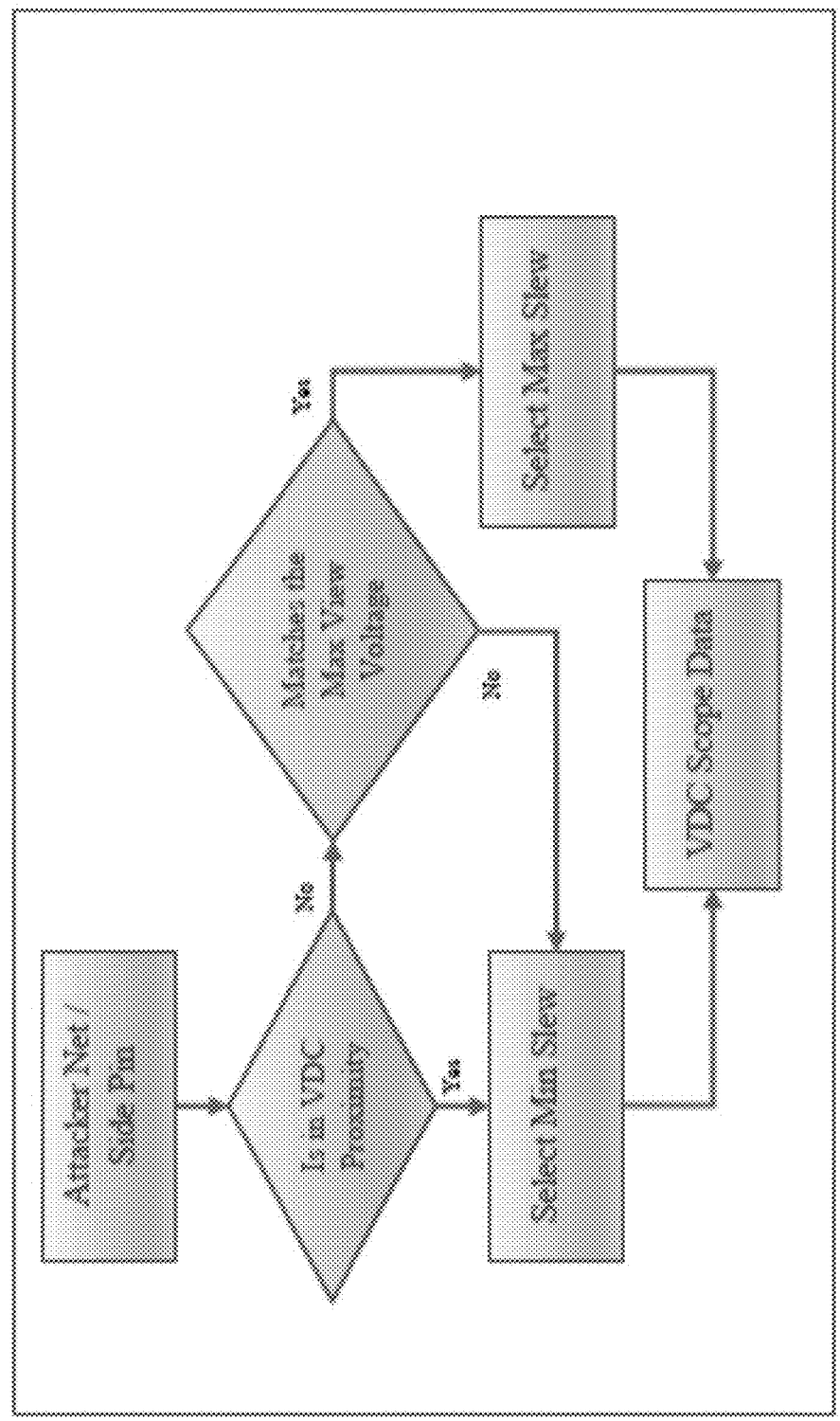
FIG. 7 is a diagram showing a proximity based slew selection according to an embodiment of the present disclosure.

In some embodiments, the pins of the instances which are not part of the VDC victim network or side pins may be checked for proximity and if they are not then the exact slew may be chosen using the same logic as for attackers (this is similar to attacker nets). FIG. 7 shows an example depicting proximity based slew selection in accordance with some embodiments.

Figure 8:
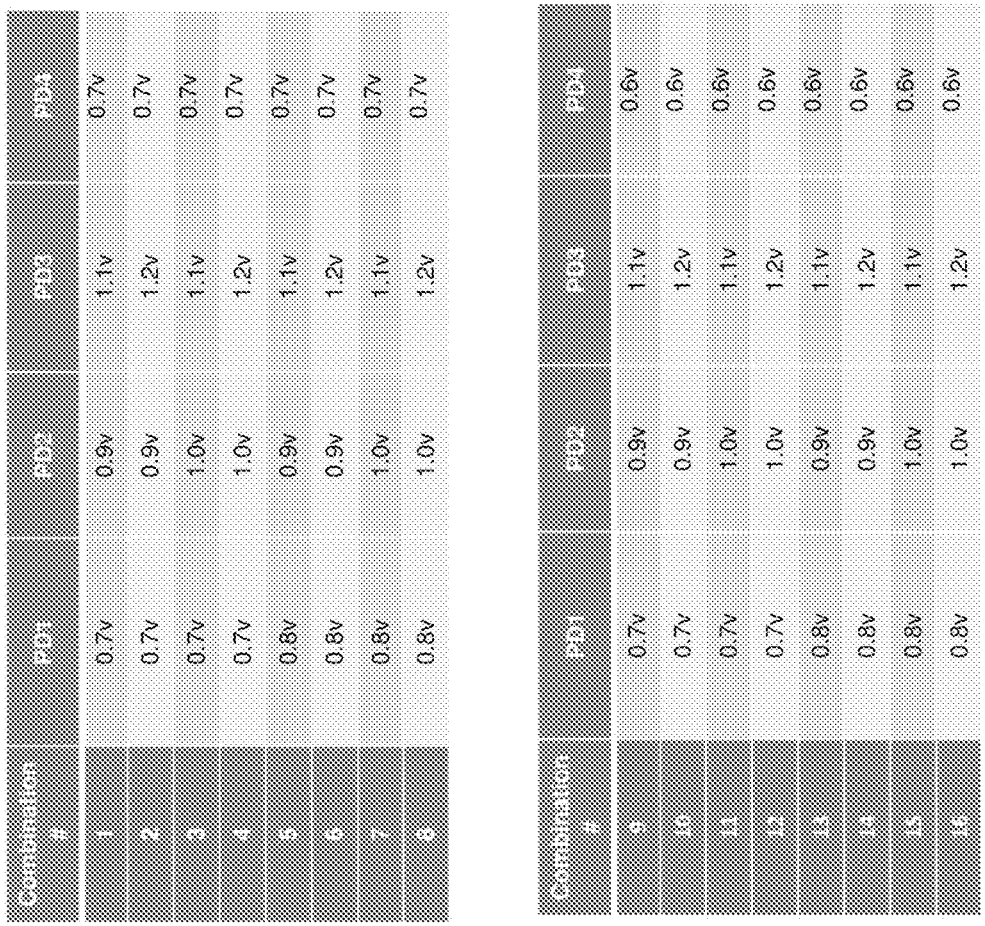
FIG. 8 is diagram showing optimized voltage combinations according to an embodiment of the present disclosure.

Referring now to FIGS. 8-9, examples showing exhaustive optimized voltage combinations are provided. When there are N interacting power domains, each having M operating voltages specified, then the worst case of M^N voltage combinations is expected. Assume the design has 4 power domains, each operating at 2 voltages: PD1 (0.7 v, 0.8 v), PD2 (0.9 v, 1.0 v), PD3 (1.1 v, 1.2 v), PD4 (0.6 v, 0.7 v). In this case, the exhaustive number of voltage combinations=2^4=16 as shown in FIG. 8. The exhaustive number of voltage combination can be enormous when the number of power domains/operating voltages are high. Optimal voltage combinations may be identified based on two approaches as shown in FIG. 9. In a first approach, voltage combinations may be created only for the interacting power domains. Here, PD1/PD2/PD3 interact with each other, but PD4 does not interact with PD1/PD2/PD3. Since PD4 does not interact with other PDs, the total number of analyses required to exhaustively cover all combinations is 8. Combinations 1-8 is sufficient since PD4 voltage need not be varied. This may result in a reduction of twice the number of voltage combinations in this case. In a second approach, a voltage combination that has been identified to cover one PD crossing may be reused for another PD crossing. If the PD interactions identified in the design are PD1<->PD2, PD1<->PD3, PD2<->PD3, then 4 combinations are sufficient (with no inter-PD coupling). As such, the number of optimal combinations reduces to 4.

In some embodiments, various VDC scope components may be saved. Some of these may include, but are not limited to, a reduced victim only netlist, victim network constraints (e.g., scope constraints only applies to the victim network within the scope and the remaining other constraints may be dropped), victim and attacker SPEF database (e.g., all the victim and network SPEF data base is retained, which is a subset of full design SPEF), power intent definition, bounded corner slews and attacker arrivals are saved and handshake with delay calculator in the scope reading or VDC analysis session.

Embodiments of DVFS based timing signoff process 10 may provide numerous advantages over existing approaches. From a quality standpoint, using bounded corners-based timing windows and slew/waveform ensures bounded VDC scope-based analysis. Moreover, DVFS based timing signoff process 10 provides numerous runtime/memory advantages as only the VDC portion of the design is analyzed for the 100+ views. The analysis may be performed on optimized voltage combinations, e.g., on a customer's design. Any bounded corner analysis is typically part of a regular timing signoff runs and the incremental cost is only due to VDC scope-based analysis.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for dynamic voltage and frequency scaling (DVFS) based timing signoff associated with an electronic design environment comprising:
   receiving, using a processor, an electronic design;
   specifying, via a graphical user interface, a voltage sweep for each power net associated with the electronic design;
   specifying, via the graphical user interface, at least one voltage sweep to be excluded from analysis;
   automatically generating DVFS configurations based upon, at least in part, the voltage sweep for each power net and the at least one voltage sweep to be excluded from analysis;
   generating a bounded corner configuration based upon, at least in part, the voltage sweep and the at least one voltage sweep to be excluded; and identifying a voltage domain crossing (VDC) only network based upon, at least in part, the bounded corner configuration.

2. The computer-implemented method of claim 1, wherein automatically generating DVFS configurations includes optimizing using one or more inter power domain network interactions and voltage transition coverage.

3. The computer-implemented method of claim 1, further comprising:
reporting the DVFS configurations for a selected voltage and power/ground net combination.

4. The computer-implemented method of claim 1, wherein identifying a VDC only network includes displaying a proximity based slew and bounded arrival window.

5. The computer-implemented method claim 1, wherein identifying a VDC only network includes common path pessimism removal (CPPR) aware clock network identification of one or more VDC paths.

6. The computer-implemented method claim 1, wherein identifying a VDC only network includes proximity based slew selection for pessimism reduction.

7. A non-transitory computer-readable storage medium having stored thereon instructions that when executed by a machine result in the following operations:
receiving, using a processor, an electronic design;
specifying, via a graphical user interface, a voltage sweep for each power net associated with the electronic design;
specifying, via the graphical user interface, at least one voltage sweep to be excluded from analysis;
automatically generating DVFS configurations based upon, at least in part, the voltage sweep for each power net and the at least one voltage sweep to be excluded from analysis;
generating a bounded corner configuration based upon, at least in part, the voltage sweep and the at least one voltage sweep to be excluded; and
identifying a voltage domain crossing (VDC) only network based upon, at least in part, the bounded corner configuration.

8. The non-transitory computer-readable storage medium of claim 7, wherein automatically generating DVFS configurations includes optimizing using one or more inter power domain network interactions and voltage transition coverage.

9. The non-transitory computer-readable storage medium of claim 7, further comprising:
reporting the DVFS configurations for a selected voltage and power/ground net combination.

10. The non-transitory computer-readable storage medium of claim 7, wherein identifying a VDC only network includes displaying a proximity based slew and bounded arrival window.

11. The non-transitory computer-readable storage medium of claim 7, wherein identifying a VDC only network includes common path pessimism removal (CPPR) aware clock network identification of one or more VDC paths.

12. The non-transitory computer-readable storage medium of claim 7, wherein identifying a VDC only network includes proximity based slew selection for pessimism reduction.

13. A system for dynamic voltage and frequency scaling (DVFS) based timing signoff associated with an electronic design environment comprising:
a computing device having at least one processor configured to receive an electronic design; and
a graphical user interface configured to allow a user to specify a voltage sweep for each power net associated with the electronic design and to specify at least one voltage sweep to be excluded from analysis;
wherein the at least one processor is further configured to automatically generate one or more DVFS configurations based upon, at least in part, the voltage sweep for each power net and the at least one voltage sweep to be excluded from analysis;
wherein the at least one processor is further configured to generate a bounded corner configuration based upon, at least in part, the voltage sweep and the at least one voltage sweep to be excluded and wherein the at least one processor is further configured to identify a voltage domain crossing (VDC) only network based upon, at least in part, the bounded corner configuration.

* * * * *